United States Patent
Jadczak et al.

(10) Patent No.: US 10,526,036 B2
(45) Date of Patent: Jan. 7, 2020

(54) BICYCLE HANDLEBAR

(71) Applicant: Canyon Bicycles GmbH, Koblenz (DE)

(72) Inventors: Sebastian Jadczak, Koblenz (DE); Alexander Forst, Koblenz (DE); Sebastian Hofer, Hamburg (DE)

(73) Assignee: Canyon Bicycles GmbH, Koblenz (DE)

( * ) Notice: Subject to any disclaimer, the term of this patent is extended or adjusted under 35 U.S.C. 154(b) by 0 days.

(21) Appl. No.: 16/062,928

(22) PCT Filed: Dec. 7, 2016

(86) PCT No.: PCT/EP2016/080110
§ 371 (c)(1),
(2) Date: Jun. 15, 2018

(87) PCT Pub. No.: WO2017/102508
PCT Pub. Date: Jun. 22, 2017

(65) Prior Publication Data
US 2018/0362110 A1 Dec. 20, 2018

(30) Foreign Application Priority Data

Dec. 18, 2015 (DE) .................. 20 2015 008 698 U

(51) Int. Cl.
*B62K 21/12* (2006.01)
*B62K 21/14* (2006.01)

(52) U.S. Cl.
CPC ............ *B62K 21/125* (2013.01); *B62K 21/14* (2013.01)

(58) Field of Classification Search
CPC ...... B62K 21/12; B62K 21/125; B62K 21/14; B62K 21/145; B62K 21/26; B62J 17/02
See application file for complete search history.

(56) References Cited

U.S. PATENT DOCUMENTS

| 586,678 | A | * | 7/1897 | Walsh | B62K 21/26 |
| | | | | | 74/551.9 |
| 615,793 | A | * | 12/1898 | Bowman | B62K 21/26 |
| | | | | | 74/551.9 |
| 5,154,094 | A | * | 10/1992 | Klieber | B62K 21/125 |
| | | | | | 280/261 |
| 5,154,095 | A | * | 10/1992 | Giard, Jr. | B62K 21/125 |
| | | | | | 74/551.1 |
| 5,163,339 | A | * | 11/1992 | Giard, Jr. | B62K 21/125 |
| | | | | | 403/374.4 |
| 5,195,394 | A | * | 3/1993 | Latta | B62K 21/125 |
| | | | | | 280/288.4 |

(Continued)

FOREIGN PATENT DOCUMENTS

| CN | 204021156 U | 12/2014 | |
| DE | 202012000857 U1 | * 3/2012 | ........... B62K 21/125 |

(Continued)

*Primary Examiner* — Adam D Rogers
(74) *Attorney, Agent, or Firm* — The Webb Law Firm

(57) ABSTRACT

A racing bicycle handlebar includes a transverse support connected to a front part and is, in particular, designed in one piece. Two lower handle elements are connected to the transverse support. In order to design additional handle elements which are optionally elastic, two upper handle elements are connected to the transverse support.

11 Claims, 2 Drawing Sheets

(56) References Cited

U.S. PATENT DOCUMENTS

| | | | | |
|---|---|---|---|---|
| 5,201,243 A | * | 4/1993 | Schneider | B62K 21/125 74/551.1 |
| 5,429,013 A | * | 7/1995 | Taylor | B62K 21/125 74/551.1 |
| 6,662,680 B2 | * | 12/2003 | Rocket | B62K 21/125 74/551.1 |
| 6,748,821 B1 | * | 6/2004 | Smith | B62K 21/125 74/551.1 |
| 7,143,662 B2 | * | 12/2006 | Hobson, Jr. | B62K 11/14 74/551.3 |
| 7,837,212 B2 | * | 11/2010 | D'Aluisio | B60T 7/10 280/279 |
| 2002/0078788 A1 | | 6/2002 | Kao | |
| 2003/0171191 A1 | * | 9/2003 | Crawford | B62K 21/12 482/57 |
| 2004/0231451 A1 | | 11/2004 | Chiang et al. | |
| 2004/0244526 A1 | * | 12/2004 | Jones | B62K 21/125 74/551.1 |
| 2005/0000313 A1 | | 1/2005 | Johnson | |
| 2006/0090589 A1 | | 5/2006 | Ording et al. | |
| 2011/0215549 A1 | * | 9/2011 | Plainfield | B23P 11/00 280/270 |
| 2016/0311497 A1 | | 10/2016 | Wagner | |
| 2018/0304956 A1 | * | 10/2018 | Sheff | B62K 21/12 |

FOREIGN PATENT DOCUMENTS

| | | | | |
|---|---|---|---|---|
| DE | 202015002911 U1 | | 9/2016 | |
| FR | 371517 A | * | 3/1907 | B62K 21/125 |
| FR | 405737 A | * | 1/1910 | B62K 21/125 |
| FR | 638790 A | * | 6/1928 | B62K 21/125 |
| FR | 857732 A | * | 9/1940 | B62K 21/125 |
| FR | 2690127 A1 | * | 10/1993 | B62K 21/145 |
| FR | 2747095 A1 | * | 10/1997 | B62K 21/14 |
| FR | 2983824 A1 | * | 6/2013 | B62K 21/14 |
| JP | 2114079 A | | 4/1990 | |
| NL | 9201686 A | * | 4/1994 | B62H 5/14 |
| WO | 9218374 A1 | | 10/1992 | |
| WO | WO-9220565 A1 | * | 11/1992 | B62K 21/145 |

* cited by examiner

BICYCLE HANDLEBAR

CROSS-REFERENCE TO RELATED APPLICATIONS

This application is the United States national phase of International Application No. PCT/EP2016/080110 filed Dec. 7, 2016, and claims priority to German Patent Application No. 20 2015 008 698.5 filed Dec. 18, 2015, the disclosures of which are hereby incorporated in their entirety by reference.

BACKGROUND OF THE INVENTION

Field of the Invention

The invention relates to a bicycle handlebar, in particular a racing bicycle handlebar.

Description of Related Art

Conventional bicycle handlebars have a transverse support connected to the handlebar stem or formed integrally with the same. The handlebar stem is connected to the steer tube. Lower handlebar elements are arranged at the two outer sides of the transverse support, which lower elements are of an arcuate and in particular semi-circular design in side view. Such conventional racing bicycle handlebars may be held in particular in three different gripping positions. On the one hand, it is possible to grip the handlebar at the lower handle elements and, on the other hand, it is possible to grip it at the transverse support. In addition, in the so-called shifter position, the handlebar is grasped at the part of the handlebar that is bent forward by 90°, with the hands in a forward directed position. Holding the bicycle handlebar at the lower handle elements is done especially in sprint. Here, high forces and moments occur. These have to be transmitted from the handle elements to the transverse support and from there to the handlebar stem into the frame. In this respect, it is requested that the handle elements have a high rigidity. In contrast thereto, the racing bicycle handlebar is held at the transverse support in more relaxed riding situations. In these situations, a certain elasticity of the handlebar would be desirable, since the fatiguing of the cyclist, in particular of the hands and the arms, would be reduced thereby. However, this conflicts with the required rigidity of the transverse support for the transmission of forces and moments from the lower handle elements.

SUMMARY OF THE INVENTION

It is an object of the invention to provide a bicycle handlebar, in particular as a replacement for the conventional handlebar shape for racing bicycles, with which comfort is improved and the occurrence of signs of fatigue is reduced.

The bicycle handlebar of the invention has a transverse support connected to a handlebar stem, which connection may also be integral. Further, two lower handle elements are connected to the transverse support, which handle elements are each arranged laterally at the transverse support. These are preferably formed integrally with the transverse support. The lower handle elements may be arcuate in side view. Because of the attachment point of the lateral handle elements at the transverse support, which is preferably lower when compared to conventional racing bicycle handlebars, the invention allows for the attachment of two additional upper handle elements to the transverse support. Here, the connection is preferably made at the lateral outer side of the transverse support. However, the connection could also be made at an inner or central region of the transverse support. Preferably, the upper handle elements are formed integrally with the transverse support. By providing additional upper handle elements according to the invention, it is possible to design them with higher elasticity, for example. This is possible, since high forces and moments can be transmitted directly to the transverse support also from the lower handle elements which are used in particular in a sprint or the like, wherein the upper handle elements are not a part of the corresponding transmission of force. The transmission of force from the lower handle elements into the handlebar stem or the frame is thus effected independently of the design of the upper handle elements. It is therefore possible to adapt the upper handle elements in an ergonomic manner and, in particular, to realize a desired elasticity and the damping caused thereby.

It is particularly preferred that the elasticity of the upper handle elements is higher than the elasticity of the lower handle elements. The riding comfort can be improved significantly thereby.

Thus, in the mounted state of the racing bicycle handlebar, the lower handle elements are preferably arranged below the handlebar stem and/or the upper handle elements are arranged above the handlebar stem, when the handlebar is in the mounted state.

In a preferred embodiment, the upper handle elements are connected to the transverse support in the outer region thereof. It is preferred that the upper two handle elements protrude inward towards the handlebar stem.

It is further preferred that the upper handle elements are arranged substantially in parallel with the transverse support. In particular, the upper handle elements are arranged in a plane parallel to the transverse support.

It is further preferred that the upper handle elements, which are preferably connected to the transverse support in an outer region thereof, are connected to each other via an intermediate element. The intermediate element may in particular be used to mount or integrate a speedometer or the like. Preferably, the intermediate element is formed integrally with the two upper handle elements.

The upper handle elements may each be connected to the transverse support either directly or via a connecting element. Again, an integral design is preferred, both for the upper handle elements with the connecting elements and, if so desired, also with the transverse support.

It is particularly preferred that the lower handle elements, which in side view are in particular arcuate in shape, smoothly merge with the upper handle elements or the connecting elements. In this respect, it is particularly preferred that the arch is continued by the connecting elements.

In a preferred embodiment, the transverse support is preferably arranged substantially horizontally, when in the mounted state. For realizing different gripping positions e.g. in dependence on the sitting position and the height of the cyclist, the transverse bar may be stepped when seen in front view. By means of a corresponding upward directed step on either side of the transverse support, it is possible to raise both the lower and the upper gripping position. Accordingly, the transverse bar may also have a substantially V-shaped cross section in front view, wherein, depending on the inclination or angle of the two legs, a different height of the lower and the upper handle elements can be realized.

In another preferred embodiment, a thumb rest is provided in a transition region between the transverse support and the upper handle elements or the connecting elements, respectively. The same may be of an ergonomic design. In this case, a central gripping position is possible in addition to the three gripping positions mentioned before.

It is particularly preferred that the transverse support is arranged such that, seen in side view, it transitions substantially horizontally into a horizontally oriented handlebar stem. The handlebar stem is preferably integral with the transverse support. Further, it is preferred that an upper side of the handlebar stem is arranged substantially step-free relative to an upper surface of the top tube of the bicycle frame. Thereby, a new dynamic design is realized and aerodynamics are improved.

In a particularly preferred embodiment, the clamping of the handlebar stem to the steer tube is effected according to the design described in DE 20 2015 002 911.

The lateral lower handle elements arranged at the transverse support may also be bent outward. Thereby, this gripping position becomes wider. Due to the wider support, a safer riding position is achieved.

In a preferred embodiment, the upper and/or the lower handle elements are designed in an ergonomic manner and are in particular adapted to the hand of the user. Preferably, this also applies to the region of the thumb rest. In a particularly preferred embodiment, these regions are thus designed corresponding to the anthropometric measures of a cyclist's hands.

The invention will be described in more detail hereinafter with reference to preferred embodiments and to the accompanying drawings.

DESCRIPTION OF THE INVENTION

Figure 1:
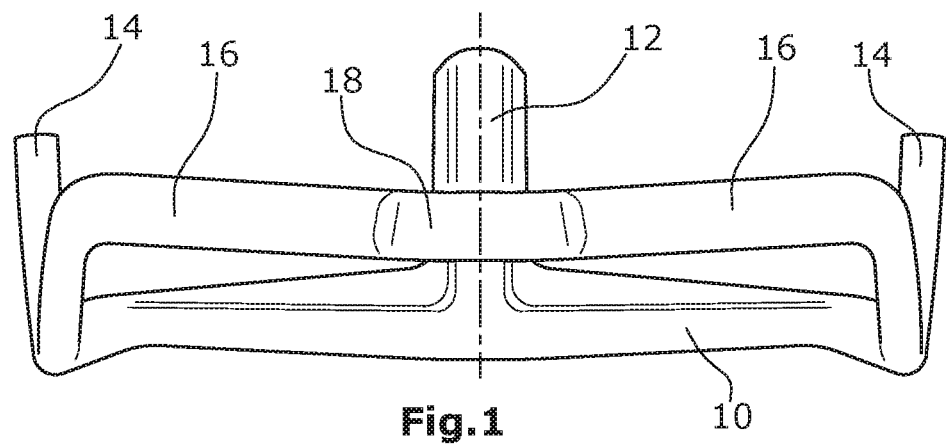
FIG. 1 is a schematic top plan view of a first preferred embodiment of the invention.
Figure 2:
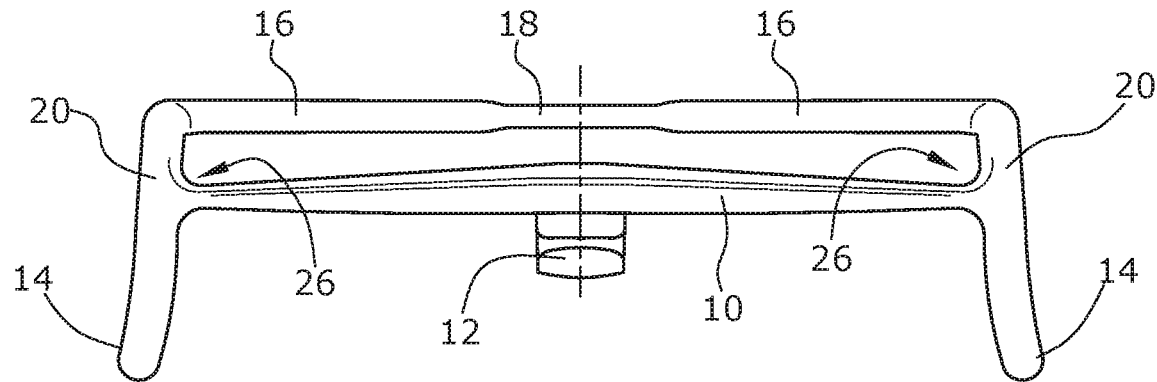
FIG. 2 is a schematic front view of the racing bicycle handlebar illustrated in FIG. 1.
Figure 3:
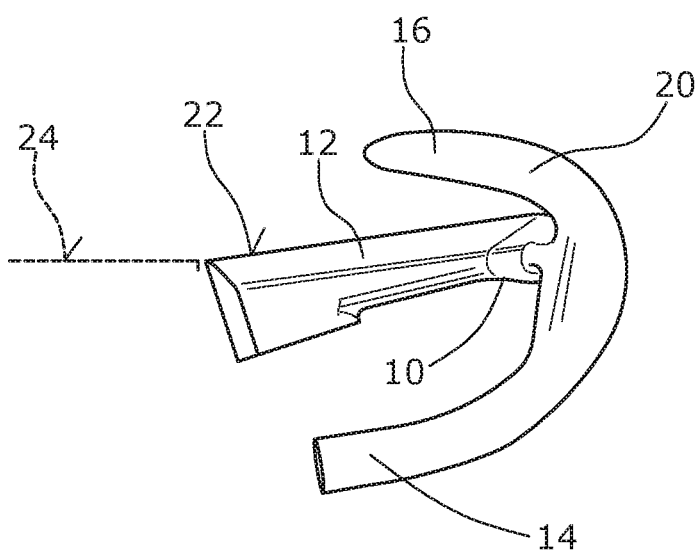
FIG. 3 is a schematic side view of the racing bicycle handlebar illustrated in FIG. 1.
Figure 4:
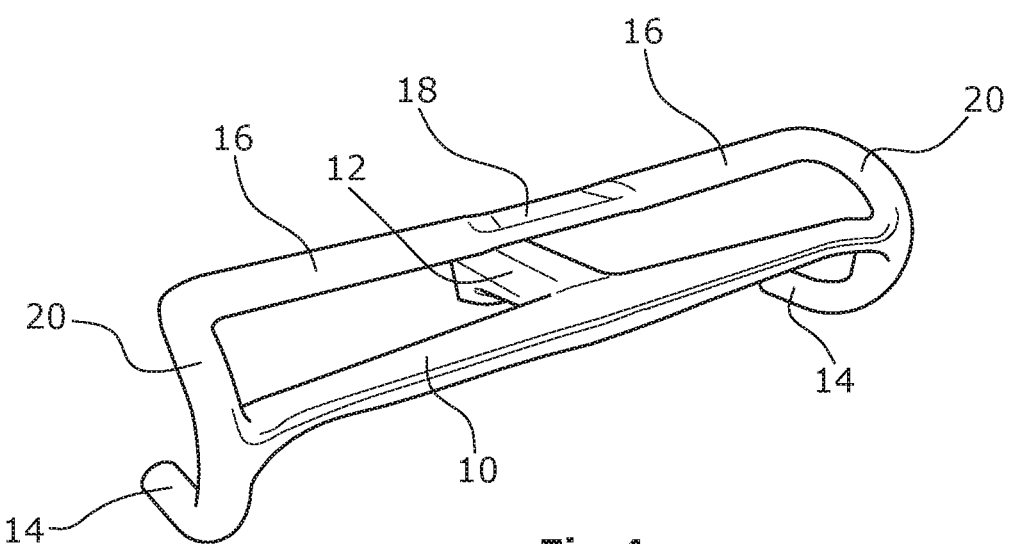
FIG. 4 is a schematic perspective view of the racing bicycle handlebar illustrated in FIG. 1.

According to the first preferred embodiment (FIGS. 1-4), the bicycle handlebar of the invention includes a transverse support 10. In the embodiment illustrated the same is integrally connected to or formed with the handlebar stem 12. Two lower handle elements 14 are connected to or integrally formed with the two outer ends of the transverse support 10. The lower handle elements have a substantially arcuate design in side view (FIG. 3).

Further, two upper handle elements 16 are connected to the transverse bar 10, which in particular have a higher elasticity. In the embodiment illustrated, the two upper handle elements 16 are connected with each other via an intermediate element 18 or are formed integrally with the same and in particular also with the transverse support 10. The upper handle elements 16 may be connected to the transverse support 10 either directly or via a connecting element 20 (FIG. 3). It is preferred that, in side view, the connecting elements 20 are also arcuate in shape. In this respect it is preferred that, in side view, the arch of the lower handle elements 14 is continued by the connecting elements 20.

In the embodiment illustrated, the upper handle elements 16 are arranged farther rearward in the traveling direction than the transverse support 10. Substantially, the upper handle elements 16 and the lower handle elements 14 are arranged one above the other in side view. It is particularly preferred that the handlebar stem is designed as described in DE 20 2015 002 911. Thereby, an extremely aerodynamic design and in particular an integration of the handlebar stem or of the connection of the handlebar stem and the steer tube are possible. It is therefore preferred that, in side view (FIG. 3), an upper side 22 of the handlebar stem steplessly transitions into an upper side 24 of a top tube illustrated in broken lines.

In the bicycle handlebar of the invention, a lower gripping position is realized by means of the lower handle elements 14, position allows high forces and moments to be transmitted to the handlebar stem. The upper handle elements 16 can be configured to be elastic, so that an upper gripping position is realized which in particular causes less fatigue. In addition, it is preferred that a thumb rest 26 is provided in a transition region between the transverse support 10 and the connecting elements 20. Thereby, a fourth gripping position is realized.

Figure 5:
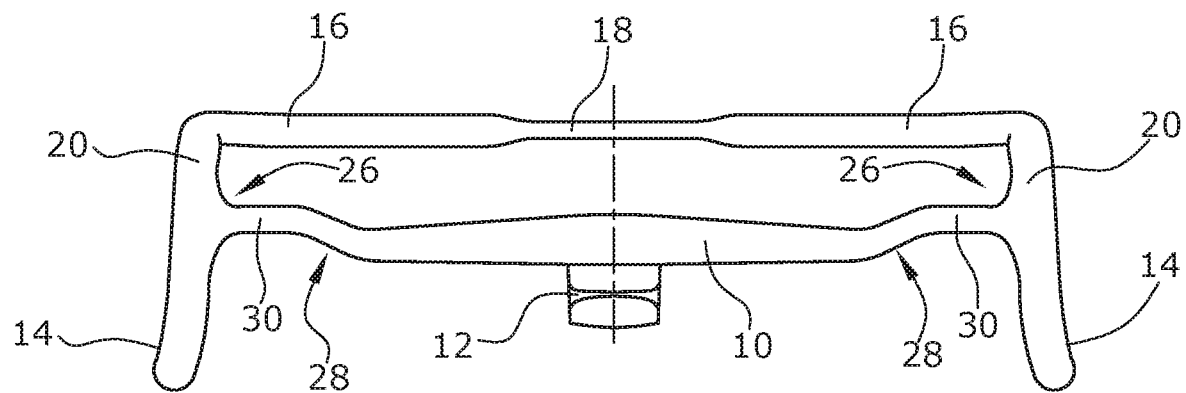
FIG. 5 is a schematic front view of a second preferred embodiment of the racing bicycle handlebar of the invention.

In a further preferred embodiment (FIG. 5) similar and identical components are identified by the same reference numerals.

This embodiment only differs in that the transverse support 10 has a stepped region 28, so that a part 30 of the transverse support 10, which is connected to the connecting element 20 or the lower handle element 14, is arranged slightly higher than the transverse support 10. Thereby, it is possible to vary the position of the lower handle element 14 as well as of the upper handle element 16. Depending of the requirements, it is possible to realize different step regions 28 with different inclinations and thus different difference in height. Likewise, a continuous V-shaped design, seen in front view (FIG. 5), of the transverse support 10 is possible, so that different heights can be realized by varying the angle.

The invention claimed is:

1. A bicycle handlebar comprising:
    a transverse support connected to a handlebar stem;
    two lower handle elements arranged laterally at the transverse support; and
    two upper handle elements arranged at the transverse support;
    wherein the elasticity of the upper handle elements is higher than the elasticity of the lower handle elements,
    wherein the upper handle elements are each connected to the transverse support by connecting elements, and
    wherein an arch of the lower handle elements is continued by the connecting elements.

2. The bicycle handlebar of claim 1, wherein, in the mounted state, the lower handle elements are arranged below the handlebar stem.

3. The bicycle handlebar of claim 1, wherein, in the mounted state, the upper handle elements are arranged above the handlebar stem.

4. The bicycle handlebar of claim 1, wherein the upper handle elements protrude inward towards the handlebar stem.

5. The bicycle handlebar of claim 1, wherein the upper handle elements are arranged substantially parallel to the transverse support.

6. The bicycle handlebar of claim 1, wherein the upper handle elements are connected to each other via an intermediate element.

7. The bicycle handlebar of claim 1, wherein the lower handle elements are arcuate in a side view.

8. The bicycle handlebar of claim 1, wherein, in a front view, the transverse support is step-shaped or V-shaped to realize different gripping positions.

9. The bicycle handlebar of claim 1, wherein the transverse support has a thumb rest in a transition region to the upper handle elements or to corresponding connecting elements.

10. The bicycle handlebar of claim 6, wherein the upper handle elements and the intermediate element are integrally formed.

11. The bicycle handlebar of claim 1, wherein the lower handle elements and the connecting elements are arcuate in a side view.

* * * * *